United States Patent [19]

Kenison et al.

[11] Patent Number: 4,655,034
[45] Date of Patent: Apr. 7, 1987

[54] TRANSIENT GAS TURBINE ENGINE BLEED CONTROL

[75] Inventors: David F. Kenison, Glastonbury; David G. Lynn, Manchester, both of Conn.

[73] Assignee: United Technologies Corporation, Hartford, Conn.

[21] Appl. No.: 683,886

[22] Filed: Dec. 20, 1984

[51] Int. Cl.⁴ .............................................. F02C 9/18
[52] U.S. Cl. ...................................... 60/39.29; 415/27
[58] Field of Search ........................ 60/39.27, 39.29; 415/26, 27, 28

[56] References Cited

U.S. PATENT DOCUMENTS 3,006,145 10/1961 Sobey ................................. 60/39.29
4,060,980 12/1977 Elsaesser et al. .................. 60/39.29
4,117,668 10/1978 Elsaesser et al. .................. 60/39.29
4,164,034 8/1979 Glennon et al. .................... 60/39.29

Primary Examiner—Louis J. Casaregola
Attorney, Agent, or Firm—Norman Friedland

[57] ABSTRACT

Flexibility in the control of the compressor bleed valve is of the type utilized in a twin spool axial flow engine for preventing compressor surge is manifested by electronically summing an approximated rate of change of burner pressure that has a first order time constant introduced to actual burner pressure and a burner pressure limit that is scheduled as a function of corrected high pressure compressor speed and the altitude of the aircraft. The signal may be treated by a hysteresis circuit to stabilize the bleed valve.

2 Claims, 1 Drawing Figure

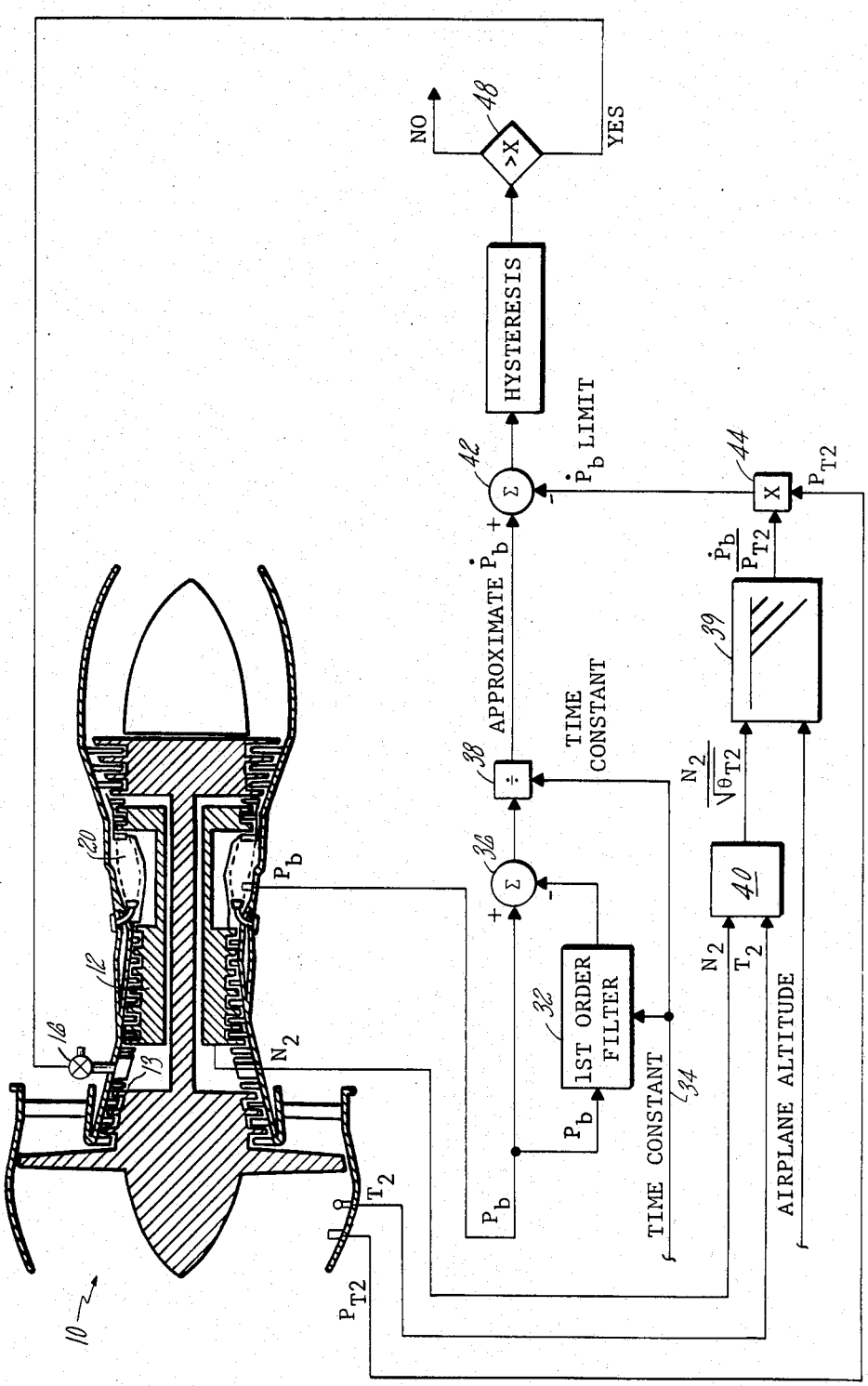

TRANSIENT GAS TURBINE ENGINE BLEED CONTROL

TECHNICAL FIELD

This invention relates to a gas turbine engines and particularly to means for controlling the compressor bleed valves during transient engine operations.

BACKGROUND ART

As is well known, it has been desirable to operate the engine close to the engine's surge line in order to achieve transients as fast as possible. Obviously, excursions beyond the surge line cannot be tolerated inasmuch as surge can result in catastropic conditions. Typically, engine controls for gas turbine engines have built-in safety measures to prevent the engine from going into surge. These controls would generally monitor certain engine parameters and by an open-looped schedule account for the surge characteristics of the particular engine for which it was designed.

Also well known is that the industry has seen attemps to take advantage of opening the compressor bleeds during transient conditions to achieve a faster response and operate closer to the surge line. An example of such a system is disclosed in U.S. Pat. No. 3,006,145 granted to A. J. Sobey on Oct. 31, 1961. However, in such a control mode it is exceedingly important to be able to ascertain when a given rate has been exceeded which is not attainable by the prior art controls as disclosed in the above-noted patent.

DISCLOSURE OF INVENTION

A feature of this invention is to electronically produce a signal for controlling the compressor bleeds of a twin spool gas turbine engine during engine transients by ascertaining when the rate of change with respect to time has exceeded a predetermined value. This invention contemplates comparing a signal indicative of an approximation of the time derivative of pressure of the burner with a schedule rate of change of pressure of the burner for providing a limit value which is calculated as a function of corrected high pressure compressor speed and altitude of the aircraft being powered by the engine. A still further feature of this invention is to apply a hysteresis value to the output signal to prevent cycling of the bleed valve.

Other features and advantages will be apparent from the specification and claims and from the accompanying drawings which illustrate an embodiment of the invention.

BRIEF DESCRIPTION OF DRAWINGS

The sole FIGURE is a box diagram schematically illustrating an electronic network for carrying out this invention.

BEST MODE FOR CARRYING OUT THE INVENTION

While this invention in its preferred embodiment is utilized to control the transients of the turbine engine for opening and closing the compressor bleed valves as will be apparent to one skilled in the art, this invention has application for other control modes. For example, this invention contemplates approximating a derivative of the measured variable, as will be apparent the same technique can be applied to other variables where it is desired to utilize the derivative of those variables and the actual computation of the derivative value is not desired.

As noted from the sole FIGURE, the invention is utilized for a twin spool gas turbine engine, as for example, the PW2037 manufactured by Pratt & Whitney Aircraft of United Technologies Corporation, the same assignee as this patent application, identified by the reference numeral 10. For an understanding of this invention, it is sufficient to appreciate that the engine is of the twin spool type having a high pressure compressor 12 and low pressure compressor 13. Suitable bleed valve 16 serves to dump compressor air to unload the compressor during certain engine operations as will be appreciated from the description to follow. The burner 20 serves to accelerate the compressed air in the well known manner by combustion of fuel so as to develop the necessary thrust to operate the compressors and generate the power for powering the aircraft.

The bleed valve 16 as is typical in these types of engines are automatically opened during certain engine operation and the control thereof is generally done by the electronic fuel control. In the PW2037 the control is the electronic control Model Number EEC-104 manufactured by Hamilton Standard Division of United Technologies Corporation, the assignee common to this patent application. The purpose of this invention is to add additional control modes that will make the control more versatile than it was heretofore.

To this end, the circuitry generates a $P_b$ signal that approximates the time derivative of the burner pressure. This is accomplished by sensing the burner pressure that is applied to the electronic filter 32 that applies a fixed time constant applied via the line 34 and simultaneously to the summer 36. The output of summer 36 which is the difference between the burner pressure and the first order time constant established by filter 32 is divided by divider 38 to produce the approximate time derivative of the pressure of the burner ($\dot{P}_b$).

This value ($\dot{P}_b$) is then compared with a scheduled $\dot{P}_b$ signal in summer 42 that is derived by generating a schedule as a function corrected high pressure compressor speed and engine inlet temperature and airplane altitude. Function generator 39 receives a signal indicative of corrected high pressure compressor speed ($N_2\sqrt{\theta_{T2}}$) from the output of the calculator 40 that responds to high pressure compressor speed ($N_2$) and engine inlet temperature ($T_2$). Calculator 40 serves to correct the speed signal in the accepted manner by relating absolute ambient temperature to standard ambient temperature. The signal generated from the function generator 39 which is biased by altitude is then multiplied by actual compressor inlet pressure ($P_{T2}$) by the multiplier 44 to produce the $\dot{P}_b$ limit signal. The schedule generated by function generator 39 after being corrected to a base value applied to summer 42 and compared with the approximated time derivative of $P_b$ ($\dot{P}_b$) and produces an error signal which is indicative of the detected transient. The signal may be either used to cause the bleed valve 16 to go open or closed. So as to assure that the bleed valve 16 doesn't oscillate and become unstable the output of the summer 42 is applied to a suitable hysteresis circuit before being transmitted to the selector circuit 48.

It should be understood that the invention is not limited to the particular embodiments shown and described herein, but that various changes and modifications may be made without departing from the spirit and scope of this novel concept as defined by the following claims.

We claim:

1. For a gas turbine twin spool engine having a high pressure compressor, low pressure compressor and a burner for powering aircraft, a bleed valve and control for opening said bleed to discharge compressor air to prevent surge, means for opening or closing said bleed valve during engine transients to operate said engine close to its surge line, said means including:

means responsive to the first order time constant of burner pressure to produce a first signal indicative of an approximate rate of change of the burner pressure, means responsive to corrected high pressure compressor speed and altitude for generating a schedule indicative of the limits of the rate of change of burner pressure for producing a second signal, and means responsive to the difference of said first signal and said second for controlling said bleed valve upon exceeding a predetermined value.

2. For a gas turbine twin spool engine as in claim 1 including a hysteresis circuit for imparting a hysteresis value to said control signal responsive to the difference between said first signal and said second signal.

* * * * *

UNITED STATES PATENT AND TRADEMARK OFFICE
CERTIFICATE OF CORRECTION

PATENT NO. : 4,655,034

DATED : April 7, 1987

INVENTOR(S) : David F. Kenison et al

It is certified that error appears in the above-identified patent and that said Letters Patent is hereby corrected as shown below:

Column 1, line 6: after "relates to" delete --a--

Column 2, line 57: after "value" insert --is then--

Signed and Sealed this

Sixth Day of October, 1987

Attest:

DONALD J. QUIGG

Attesting Officer      Commissioner of Patents and Trademarks